(12) United States Patent
Kim et al.

(10) Patent No.: US 11,136,032 B2
(45) Date of Patent: Oct. 5, 2021

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Sang Joon Kim, Seoul (KR); Young Chul Kim, Seongnam-si (KR); Leehyoung Cho, Suwon-si (KR); Dong Ho Yang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 433 days.

(21) Appl. No.: 15/802,914

(22) Filed: Nov. 3, 2017

(65) Prior Publication Data
US 2018/0345974 A1   Dec. 6, 2018

(30) Foreign Application Priority Data

Jun. 2, 2017 (KR) .......................... 10-2017-0069112

(51) Int. Cl.
*B60W 30/18* (2012.01)
*B60W 40/04* (2006.01)
*B60W 50/16* (2020.01)
*B60W 50/14* (2020.01)

(52) U.S. Cl.
CPC ...... *B60W 30/18072* (2013.01); *B60W 40/04* (2013.01); *B60W 50/16* (2013.01); *B60W 2050/146* (2013.01); *B60W 2554/00* (2020.02); *B60W 2554/80* (2020.02); *B60W 2556/50* (2020.02)

(58) Field of Classification Search
None
See application file for complete search history.

(56) References Cited

U.S. PATENT DOCUMENTS

| | | | | |
|---|---|---|---|---|
| 8,165,747 | B2* | 4/2012 | Ueno | B60T 7/042 |
| | | | | 701/36 |
| 9,896,106 | B1* | 2/2018 | Wrobel | B60W 50/14 |
| 10,408,338 | B2* | 9/2019 | Ota | F16H 61/029 |
| 2005/0101435 | A1* | 5/2005 | Cowan | B60W 30/18 |
| | | | | 477/83 |
| 2006/0231074 | A1* | 10/2006 | Ueno | B60T 7/042 |
| | | | | 123/399 |
| 2006/0293824 | A1* | 12/2006 | Steen | B60K 17/26 |
| | | | | 701/70 |
| 2007/0276582 | A1* | 11/2007 | Coughlin | B60W 40/09 |
| | | | | 701/123 |

(Continued)

FOREIGN PATENT DOCUMENTS

JP      2013-199144 A    10/2013

*Primary Examiner* — Nicholas K Wiltey
(74) *Attorney, Agent, or Firm* — Morgan, Lewis & Bockius LLP

(57) ABSTRACT

A vehicle and a method for controlling the same are provided to induce inertial driving of a driver by guiding the inertial driving of the vehicle and controlling an accelerator pedal so that a pedal effort is applied to the accelerator pedal. The vehicle includes a display configured to display an object guiding the inertial driving, and a controller configured to apply a pedal effort to an accelerator pedal when guiding the inertial driving to induce the inertial driving.

12 Claims, 5 Drawing Sheets

(56) References Cited

U.S. PATENT DOCUMENTS

| | | | | |
|---|---|---|---|---|
| 2008/0287259 A1* | 11/2008 | Huen | ............ | B60K 26/04 477/174 |
| 2009/0030582 A1* | 1/2009 | Jacobi | ............ | B60K 26/021 701/51 |
| 2011/0205044 A1* | 8/2011 | Enomoto | ............ | B60K 35/00 340/439 |
| 2012/0078467 A1* | 3/2012 | Schweikl | ............ | B60K 37/02 701/36 |
| 2012/0078496 A1* | 3/2012 | Uber | ............ | B60K 35/00 701/123 |
| 2012/0167708 A1* | 7/2012 | Brandt | ............ | B60K 26/021 74/513 |
| 2012/0197501 A1* | 8/2012 | Sujan | ............ | B60W 10/11 701/51 |
| 2013/0211696 A1* | 8/2013 | Frey | ............ | B60K 26/02 701/110 |
| 2014/0316626 A1* | 10/2014 | Amano | ............ | B60W 20/00 701/22 |
| 2015/0035663 A1* | 2/2015 | Sugano | ............ | G08G 1/166 340/436 |
| 2016/0101780 A1* | 4/2016 | Park | ............ | B60W 50/14 701/70 |
| 2016/0121898 A1* | 5/2016 | Jo | ............ | B60W 30/18072 701/22 |
| 2016/0176413 A1* | 6/2016 | Oguri | ............ | B60W 20/14 701/22 |
| 2016/0200194 A1* | 7/2016 | Maruyama | ............ | B60K 26/021 74/512 |
| 2017/0137030 A1* | 5/2017 | Fujita | ............ | F02D 41/123 |
| 2018/0277019 A1* | 9/2018 | Wrobel | ............ | G01C 21/34 |
| 2019/0241075 A1* | 8/2019 | Kurosawa | ............ | B60W 30/18072 |
| 2019/0257415 A1* | 8/2019 | Kook | ............ | F16H 61/0213 |
| 2019/0359213 A1* | 11/2019 | Huh | ............ | B60W 30/18127 |
| 2019/0360536 A1* | 11/2019 | Kitai | ............ | B60K 23/02 |

* cited by examiner

VEHICLE AND METHOD FOR CONTROLLING THE SAME

CROSS-REFERENCE TO RELATED APPLICATION(S)

The present application is based on and claims the benefit of priority to Korean Patent Application No. 10-2017-0069112, filed on Jun. 2, 2017 with the Korean Intellectual Property Office, the disclosure of which is incorporated by reference in its entirety.

TECHNICAL FIELD

Embodiments of the present disclosure relate to a vehicle.

BACKGROUND

A situation in which inertial driving is necessary may arise in order to prevent waste of power for unnecessary acceleration of a vehicle.

The vehicle may provide a driver with a guidance of the inertial driving to induce a driver to perform the inertial driving in situations where inertia driving is required.

However, it may be difficult for the driver who is concentrating on his or her driving to see the provided guidance of the inertial driving since the guidance of inertial driving may distract the driver.

SUMMARY

As one aspect of the present disclosure, a vehicle and a method controlling the same are provided to induce an inertial driving of a driver by guiding the inertial driving of the vehicle and controlling an accelerator pedal so that a pedal effort is applied to the accelerator pedal.

In accordance with one aspect of the present disclosure, a vehicle may include: a display configured to display an object guiding inertial driving; and a controller configured to apply a pedal effort to an accelerator pedal when guiding the inertial driving to induce the inertial driving.

The controller may be configured to display the object on a display when deceleration of the vehicle is required to a predetermined speed within a predetermined distance.

The controller may be configured to increase the pedal effort of the accelerator pedal until the pedal effort reaches a predetermined reference value when deceleration of the vehicle to a predetermined speed within a predetermined distance is required.

The controller may be configured to control the pedal effort of the accelerator pedal so that the pedal effort applied to the accelerator pedal during the inertial driving of the vehicle is maintained at a predetermined reference value.

The controller may be configured to gradually reduce the pedal effort applied to the accelerator pedal when the inertial driving of the vehicle is terminated.

The controller may be configured to gradually reduce the pedal effort applied to the accelerator pedal when the vehicle is decelerated to a predetermined speed.

The controller may be configured to determine to perform guidance on the inertial driving of the vehicle when it is determined that deceleration of the vehicle is required based on a driving route and road information.

In accordance with one aspect of the present disclosure, a method for controlling a vehicle may include steps of: determining whether guidance for inertial driving of the vehicle is required; displaying an object guiding the inertial driving on a display when the guidance for the inertial driving of the vehicle is required; and applying a pedal effort to an accelerator pedal to induce the inertial driving.

The step of displaying an object guiding the inertial driving on a display includes: displaying the object on the display when deceleration of the vehicle is required to a predetermined speed within a predetermined distance.

The step of applying a pedal effort to an accelerator pedal may include: increasing the pedal effort of the accelerator pedal until the pedal effort reaches a predetermined reference value when deceleration of the vehicle is required to a predetermined speed within a predetermined distance.

The step of applying a pedal effort to an accelerator pedal may include: controlling the pedal effort of the accelerator pedal so that the pedal effort applied to the accelerator pedal during the inertial driving of the vehicle is maintained at a predetermined reference value.

The step of applying a pedal effort to an accelerator pedal may include: gradually reducing the pedal effort applied to the accelerator pedal when the inertial driving of the vehicle is terminated.

The step of applying a pedal effort to an accelerator pedal may include: gradually reducing the pedal effort applied to the accelerator pedal when the vehicle is decelerated to a predetermined speed.

The step of determining whether guidance for inertial driving of the vehicle is required may include: determining to perform guidance on the inertial driving of the vehicle when it is determined that deceleration of the vehicle is required based on a driving route and road information.

BRIEF DESCRIPTION OF THE DRAWINGS

The above and/or other aspects of the present disclosure will become apparent and more readily appreciated from the following description of embodiments, taken in conjunction with the accompanying drawings of which.

DETAILED DESCRIPTION

Figure 1:
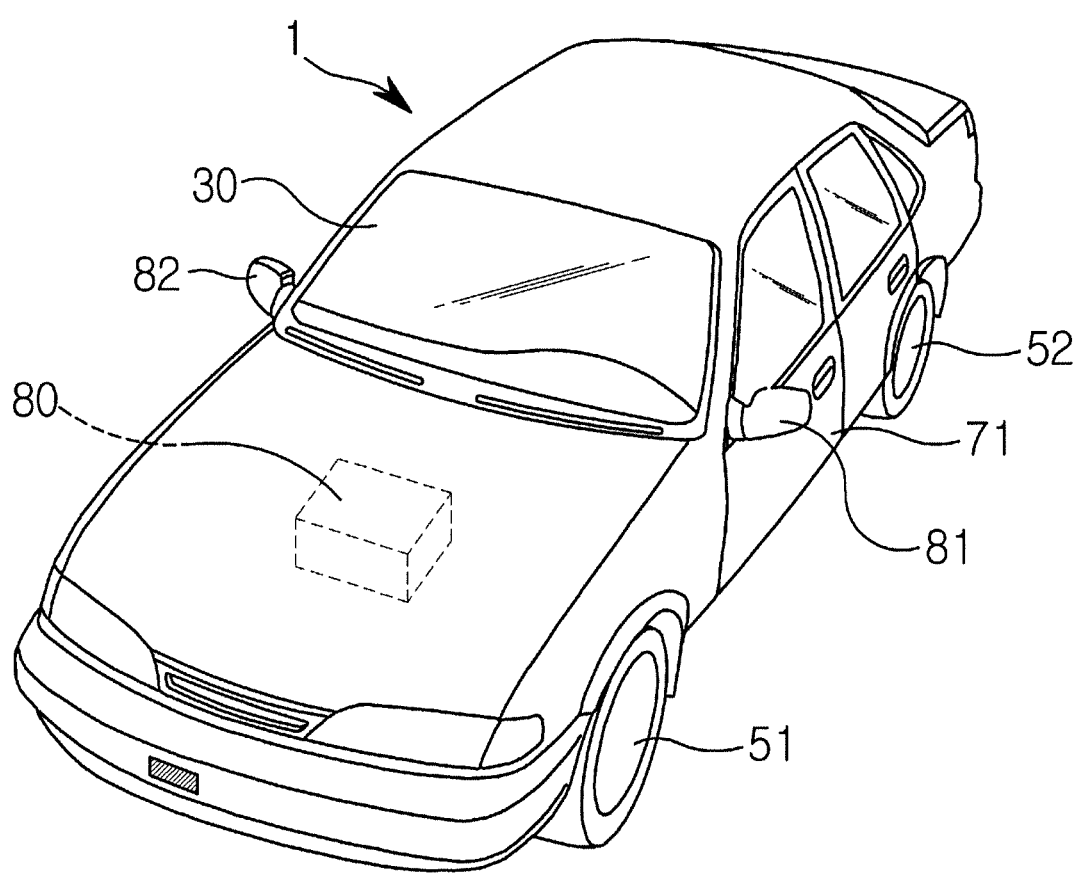
FIG. 1 is a view illustrating an exterior of a vehicle in accordance with an embodiment of the present disclosure.

The description discloses the principles of the present disclosure and discloses embodiments of the present disclosure so that those skilled in the art will be able to practice the present disclosure while clarifying the scope of the present disclosure. The disclosed embodiments may be implemented in various forms.

Like reference numerals refer to like elements throughout the description. Well-known functions or constructions are not described in detail since they would obscure one or more exemplary embodiments with unnecessary detail. Terms such as "part" and "portion" may be embodied as hardware or software. According to the embodiments, a plurality of "parts" and "portions" may be embodied as a single component or a single "part" and "portion" and may include a plurality of components.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Reference will now be made in detail to the embodiments of the present disclosure, examples of which are illustrated in the accompanying drawings.

Figure 2:
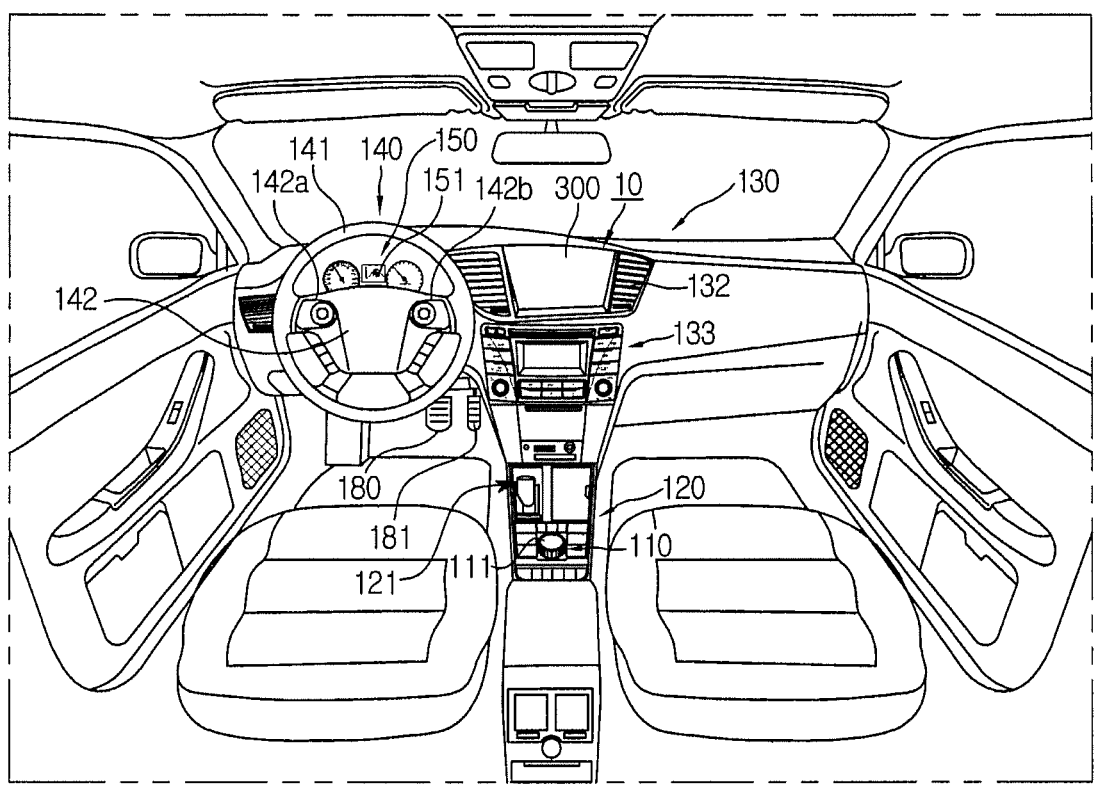
FIG. 2 is a view illustrating an interior configuration of a vehicle in accordance with an embodiment of the present disclosure.

FIG. 1 is a view illustrating an exterior of a vehicle in accordance with an embodiment of the present disclosure, and FIG. 2 is a view illustrating an interior configuration of a vehicle in accordance with an embodiment of the present disclosure.

Referring to FIG. 1, according an embodiment, the vehicle may include a body 1 forming an exterior of the vehicle, vehicle wheels 51 and 52 moving the vehicle, a driving device 80 driving the vehicle wheels 51 and 52, a door 71 closing inside of the vehicle from outside, a front glass 30 providing a front view of the vehicle to a driver, and a side mirror 81 and 82 providing a view of a rear side of the vehicle to the driver.

The vehicle wheels 51 and 52 may include the front wheel 51 provided on a front of the vehicle and the rear wheel 52 provided on a rear of the vehicle.

The driving device 80 may supply torque to the front wheel 51 or the rear wheel 52 so that the body 1 may be moved forward and backward. The driving device 80 may include an engine configured to generate torque by burning a fossil fuel or a motor configured to generate torque by receiving power from a battery (not shown).

The door 71 may be rotatably provided on a right side and a left side of the body 1. When the door 71 is opened, the driver may be allowed to be seated in the vehicle, and when the door 71 is closed, the inside of the vehicle may be closed from the outside.

The front glass 30 that is referred to as a "windshield glass" may be provided on an upper portion of the front of the body 1. The driver inside the vehicle may see the front view via the front glass 30.

A side mirror may include a left side mirror 81 provided on the left side of the body 1 and a right side mirror 82 provided on the right side of the body 1. The driver inside of the vehicle may visually recognize situations on the lateral side and/or the rear side of the vehicle.

In addition, the vehicle may include a variety of sensors to help the driver to recognize situations of the surroundings of the vehicle by detecting an obstacle placed adjacent to the vehicle. For example, the vehicle may include a plurality of cameras to acquire images of the front, rear, left and right side of the vehicle. The vehicle may include a distance sensor such as a radar or a LIDAR (Light Detection and Ranging) or an ultrasonic sensor capable of sensing distances to other vehicles, distances to obstacles, and the like.

As illustrated in FIG. 2, a dashboard of the vehicle may include a gear box 120, a center fascia 130, a steering wheel 140 and a gauge board 150.

In the gear box 120, a gear lever 121 configured to change a speed of the vehicle may be installed. As illustrated in the drawings, in the gear box 120, an input device 110 including a dial operation unit 111 and a variety of buttons may be provided to control functions of a multimedia device including a navigation device 10 or an audio device 133, and operate main functions of the vehicle.

In the center fascia 130, an air conditioning device 132, the audio device 133 and the navigation device 10 may be installed.

The air conditioning device 132 may keep the air inside the vehicle fresh by controlling the temperature, the moisture, air cleanliness, and the flow of air inside of the vehicle. The air conditioning device 132 may include at least one discharging portion, which is configured to discharge air, installed in the center fascia 130. A button or a dial may be installed in the center fascia 130 to control the air conditioning device 132. A user such as the driver may control the air conditioning device 132 by using the button disposed on the center fascia. In addition, the user may control the air conditioning device 132 using buttons or the dial operation unit 111 of the input device 110 installed in the gear box 120.

According to an embodiment of the present disclosure, the navigation device 10 may be installed and embedded in the center fascia 130 of the vehicle. According to an embodiment, an input unit configured to control the navigation device 10 may be installed in the center fascia 130. Alternatively, the input unit of the navigation device 10 may be installed in another position other than in the center fascia 130. For example, the input unit of the navigation device 10 may be formed around a display 300 of the navigation device 10. Alternatively, the input unit of the navigation device 10 may be installed in the gear box 120. The input unit may include an input unit for receiving an instruction for turning on or off the inertial driving guidance function, which will be described later.

The steering wheel 140 may be a device configured to adjust a driving direction of the vehicle, and may include a rim 141 held by the driver and a spoke 142 connected to a steering system of the vehicle and configured to connect the rim 141 to a hub of a rotation shaft for steering. According to the embodiment, manipulation devices 142a and 142b may be formed in the spoke 142 to control various devices inside the vehicle, such as the audio device 133, etc. The steering wheel 140 may have a function to warn the driver so that the driver drives safely. For example, the steering wheel 140 may warn the driver in drowsy driving in a tactual manner through vibration when the driver falls asleep at the wheel, or the steering wheel 140 may warn the driver of danger by the vibration when a risk of accident is identified due to a change in driving conditions.

A variety of the gauge boards 150 indicating driving speed of the vehicle and revolutions per minute (RPM) or the remaining fuel quantity may be installed in the dashboard. The gauge board 150 may include a gauge display 151 indicating information related to the vehicle's condition and the vehicle's driving, and information related to operation of a multimedia device. The gauge display 151 according to one embodiment of the present disclosure may display an object including an image or a text for guiding inertial driving so as to induce the inertial driving of the driver.

When a brake pedal 180 is operated by the driver, a braking force is generated on the vehicle and the vehicle is decelerated. When an accelerator pedal 181 is operated by the driver, the vehicle is accelerated.

Unnecessary operation of the accelerator pedal 181 may generate unnecessary acceleration of the vehicle, leading to wasting fuel. When the vehicle is decelerated through inertial driving, the vehicle may display an object for inducing inertial driving through the gauge display 151 or the display 300 of the navigation device 10 to guide the inertial driving to the driver. When the driver does not see the object guiding the inertial driving displayed on the display 300 or does not intend to perform inertial driving, the driver may operate the accelerator pedal 181 unnecessarily, and the fuel of the vehicle may be unnecessarily wasted. When the driver sees the object guiding the inertial driving displayed on the display 300, the driver may not be able to view the forward direction instantaneously, which may increase the risk of an accident. The disclosed embodiment may visually perform the inertial driving guidance through the display 300 and may perform the inertial driving guidance in a tactile manner through the control of pedal effort of the accelerator pedal 181. The disclosed embodiment provides the vehicle and the method for controlling the same capable of efficiently inducing inertial driving. The vehicle and the method for controlling the same according to the embodiments disclosed below are described in detail with reference to FIGS. 3 to 5.

Figure 3:
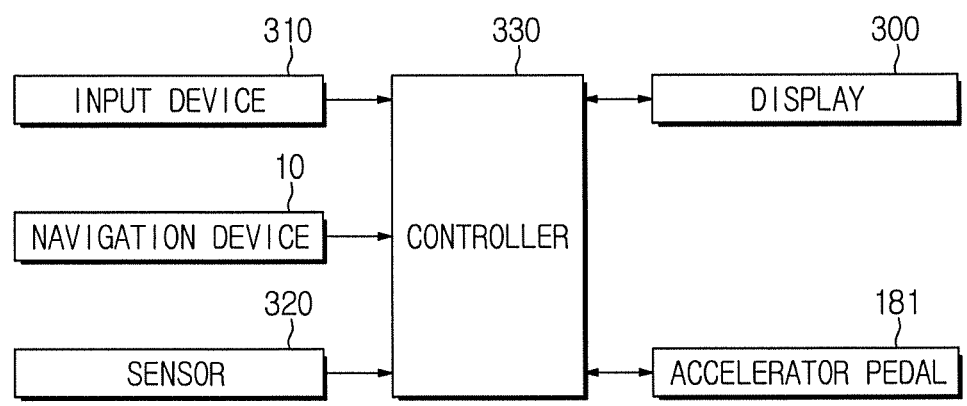
FIG. 3 is a control block diagram of a vehicle in accordance with an embodiment of the present disclosure.
Figure 4:
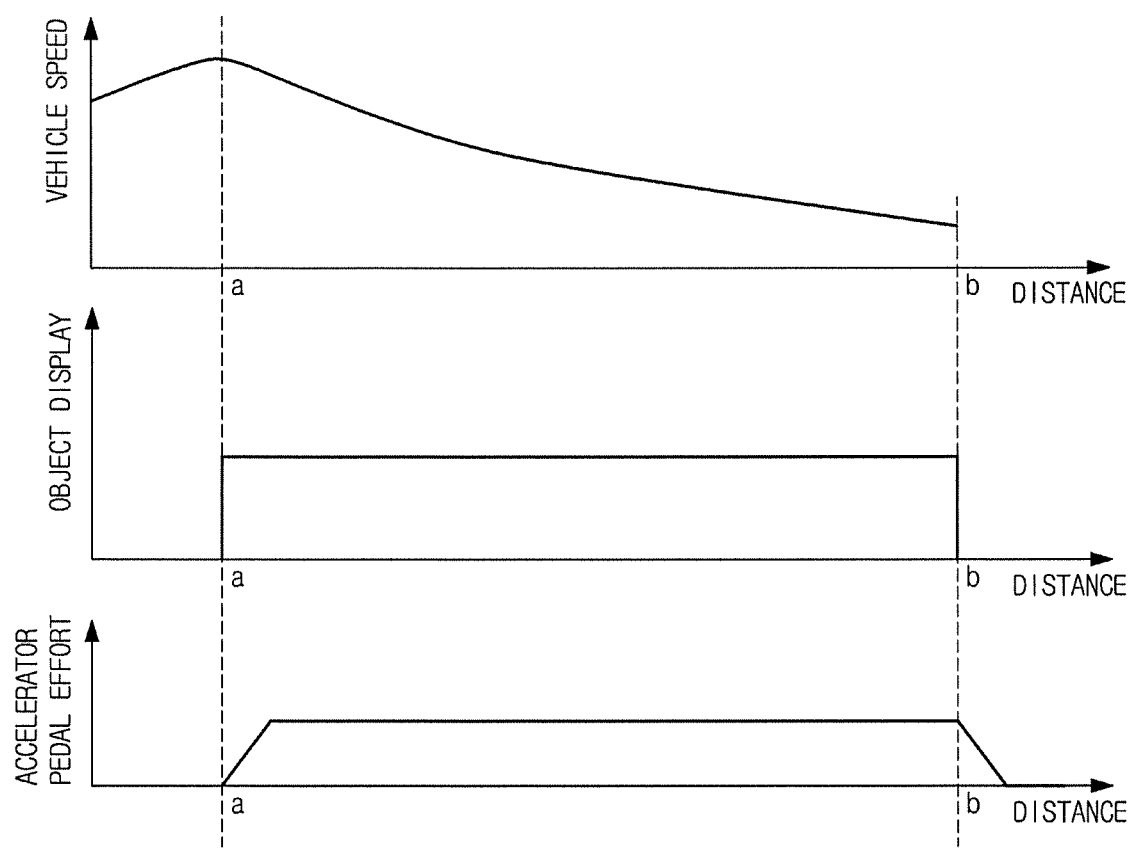
FIG. 4 is a view illustrating that a pedal effort is applied to an accelerator pedal during inertial driving of a vehicle in accordance with an embodiment of the present disclosure.
Figure 5:
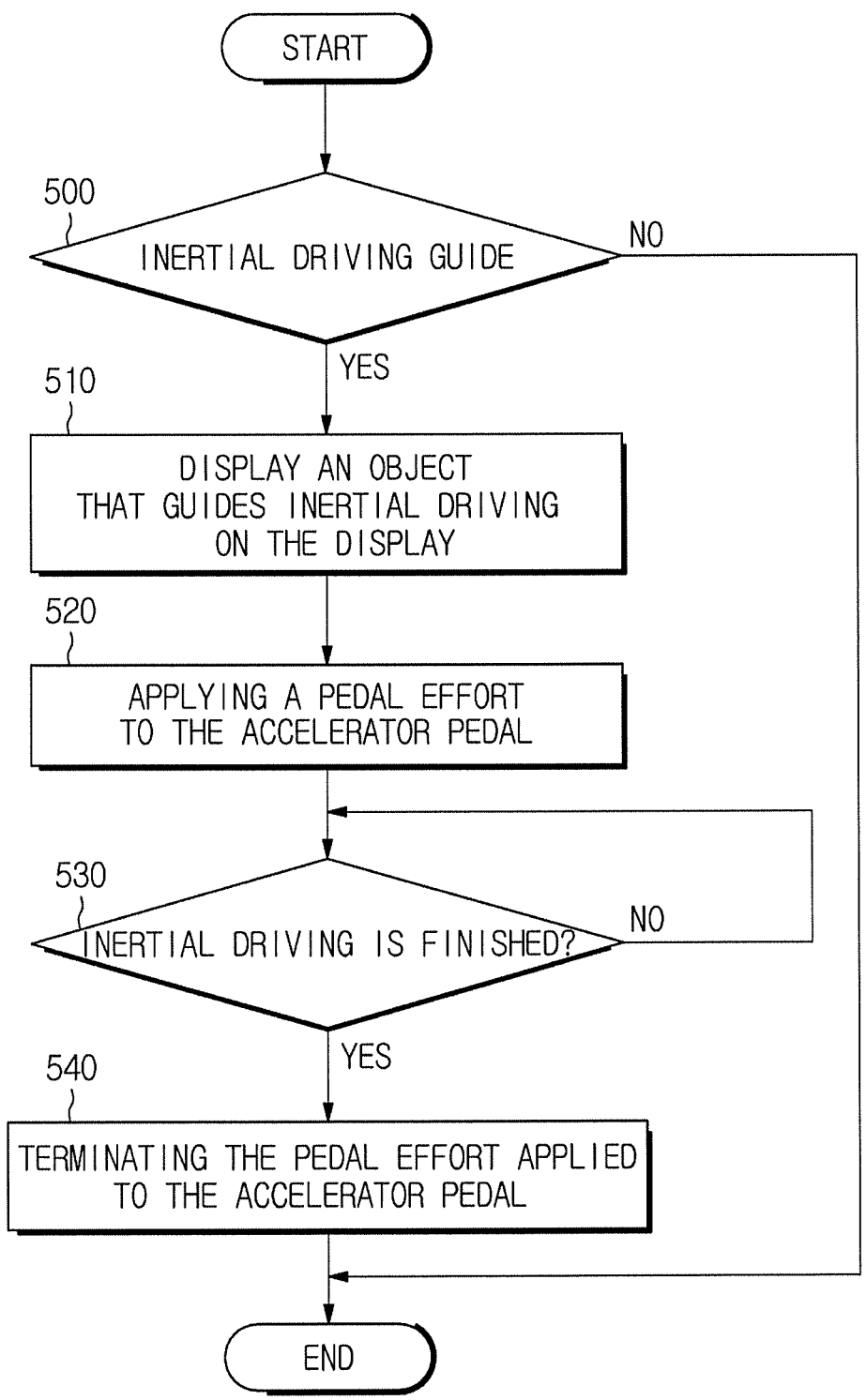
FIG. 5 is flow chart of a control method of a vehicle in accordance with an embodiment of the present disclosure.

FIG. 3 is a control block diagram of a vehicle in accordance with an embodiment of the present disclosure. FIG. 4 is a view illustrating that a pedal effort is applied to an accelerator pedal during inertial driving of a vehicle in accordance with an embodiment of the present disclosure. FIG. 5 is flow chart of a control method of a vehicle in accordance with an embodiment of the present disclosure.

Referring to FIG. 3, the vehicle according to an exemplary embodiment of the present disclosure includes an input device 310 configured to receive a command related to on/off of inertial driving guidance, a navigation device 10 configured to provide information about a driving route or a road, a sensor 320 configured to sense a situation around the vehicle, a display 300 configured to display an object guiding the inertial driving, an accelerator pedal 181 for applying a pedal effort during inertial driving and controller 330 configured to determine whether or not the vehicle is in the inertial driving state and accordingly control the display of the object of the display 300 and applying the pedal effort of the accelerator pedal 181.

The sensor 320 may include a camera capable of acquiring images of the surroundings of the vehicle. The camera may include a front camera that acquires an image of the front of the vehicle, a rear camera that acquires an image of the rear of the vehicle, and a side camera that acquires an image of the side of the vehicle. If the camera acquires the front, rear, left, and right images of the vehicle, there is no restriction on the installation position or number of the cameras. The camera may include a CCD or CMOS sensor.

In addition, the sensor 320 may include a distance sensor capable of sensing an object around the vehicle. The distance sensor may detect an object (i.e., external object) located in an external region of the vehicle. For example, the distance sensor may detect a preceding vehicle traveling in a forward direction of the vehicle, a road, stationary objects including a structure such as a guard rail installed around the road, and an oncoming vehicle from among opposite lanes. In addition, the distance sensor may detect the lane markings of the road or the signals reflected from the road surface, thereby calculating the data including the ground information and the lane information of the road. The distance sensor of the vehicle according to the disclosed embodiment may include an ultrasonic sensor, a radar, or a light detection and ranging (LIDAR).

The input device 310 may be provided so that the user can input a command to turn on or turn off the inertial driving guidance function. The inertial driving guidance function may be set to be automatically turned on in the case of a so-called eco mode in which the driving mode of the vehicle is focused on fuel efficiency improvement. The inertial driving guidance function may be turned off through the input device 310 described above. The input device 310 may be included in the input unit of the navigation device 10 or may be separately provided.

The input device 310 may be provided in a center fascia, a gear box, or a steering wheel, and may be implemented in various forms such as a hard key or a soft key type button, a toggle switch, a dial, a voice recognition device, and a motion recognition device.

The navigation device 10 may store map data including a driving route and road information, and may provide a driving route or road information necessary for the controller 330 to determine an inertial driving situation.

The controller 330 is an electric circuitry that executes instructions of software which thereby performs various functions described hereinafter.

The controller 330 may determine whether or not the vehicle is in an inertial driving state based on the information sensed by the sensor 320 or the driving route and the road information of the navigation device 10. The controller 330 may determine that the vehicle is capable of inertial driving when the vehicle is to be decelerated to a predetermined speed within a predetermined distance based on the information of the sensor 320 or the navigation device 10. For example, when the controller 330 identifies a speed camera (for example, a sensing reference speed of 60 km/h) at a distance of 500 meters ahead based on the information of the sensor 320 or the navigation device 10 and determines that the vehicle can be decelerated through inertial driving until the vehicle reaches the speed camera based on the current speed, the controller 330 may determine that the inertial driving is possible.

The controller 330 may determine that the vehicle may be decelerated through inertial driving when a distance to a speed limit point is less than a predetermined distance and the current speed of the vehicle is higher than the reference speed of the speed limit point by more than a predetermined speed based on the current speed information of the vehicle, the speed limit information on the driving route provided by the navigation device 10 and the distance information to the speed limit point. When the controller 330 determines that inertial driving is possible, the controller 330 may display a predetermined object on the display 300 so as to guide the inertial driving. The object may be an image or text that characterizes inertial driving. The controller 330 may display the object on a gauge display 151 or display the object via the display 300 of the center fascia. The display 300 described below collectively refers to the above-described gauge display 151 and the display 300 of the center fascia.

When the inertial driving is possible, the controller 330 displays the object on the display 300 as described above. Then, when the driver intends to operate the accelerator pedal 181, the controller 330 may apply the pedal effort to the accelerator pedal 181 so that the driver can tactually recognize the guidance for the inertial driving.

The accelerator pedal 181 may include an accelerator pedal control device for controlling the pedal effort applied to the accelerator pedal 181. Then, the controller 330 may apply the pedal effort to the accelerator pedal 181 by controlling the accelerator pedal control device. As another example, the controller 330 may be understood as an integrated controller including the accelerator pedal control device.

Referring to FIG. 4, the controller 330 displays the object on the display 300 at the guiding time point (a) of inertial driving and applies the pedal effort to the accelerator pedal 181. The controller 330 may control the increase of the pedal effort such that the pedal effort applied to the accelerator pedal 181 gradually reaches a predetermined reference value as illustrated in FIG. 4. The rate of increase of the pedal effort applied to the accelerator pedal 181 may follow a predetermined rate of increase.

The rate of increase of the pedal effort applied to the accelerator pedal may be determined based on the distance information to the speed limit point described above. For example, the controller 330 may control the increase rate of the pedal effort applied to the accelerator pedal to be increased within a predetermined upper limit as the distance to the speed limit point becomes shorter. Also, the controller 330 may control the increase rate of the pedal effort applied to the accelerator pedal to be decreased within a predetermined lower limit as the distance to the speed limit point becomes longer. The controller 330 may control the increase rate of the pedal effort in consideration of a difference between the current speed of the vehicle and the speed limit on the road.

The controller 330 maintains the pedal effort applied to the accelerator pedal 181 at reference constant value when the pedal effort applied to the accelerator pedal 181 reaches a predetermined reference value. Even if the driver does not identify the object displayed on the display 300, the pedal effort is applied to the accelerator pedal 181, and the driver can recognize that the vehicle is in the inertial driving state and perform the inertial driving.

When the vehicle is decelerated to a predetermined speed within a predetermined distance (b), the controller 330 does not display the object displayed on the display 300 in order to inform the driver of termination of the inertial driving. Also, when the vehicle is decelerated to a predetermined speed within a predetermined distance (b), the controller 330 may control the accelerator pedal 181 such that the pedal effort is not applied to the accelerator pedal 181. The controller 330 may control the reduction of the pedal effort such that the pedal effort is gradually removed without an immediate reduction of the pedal effort applied to the accelerator pedal 181. When the inertial driving is terminated, the decrease rate of the pedal effort applied to the accelerator pedal 181 may follow a predetermined decrease rate.

The method for controlling the vehicle according to the disclosed embodiment is described with reference to FIG. 5.

Referring to FIG. 5, when the inertial driving is guided (500), the controller 330 displays an object for guiding the inertial driving on the display 300 (510), and applies the pedal effort to the accelerator pedal 181 (520).

When the inertial driving is finished (530), the controller 330 terminates the applying of the pedal effort applied to the accelerator pedal 181 (540).

According to the disclosed embodiments, the guidance relating to the inertial driving may be visually performed through the display 300 and performed in a tactile manner through the control of pedal effort of the accelerator pedal 181, so that the driver can focus on the forward gaze. In addition, the vehicle according to the disclosed embodiments can control the pedal effort of the accelerator pedal 181 to prevent unnecessary energy consumption, thereby improving fuel economy.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
    a display configured to display an object guiding inertial driving;
    an accelerator pedal configured to apply a reaction force; and
    a controller configured to:
        display the object guiding inertial driving at a guiding time point; and
        control the accelerator pedal to apply the reaction force, when guiding the inertial driving, to induce the inertial driving,
    wherein the object is at least one of an image or a text that characterizes inertial driving,
    wherein the controller is configured to gradually reduce the reaction force applied to the accelerator pedal after the vehicle is decelerated to a predetermined speed,
    wherein the controller is configured to control an increase rate of the reaction force to be increased within a predetermined upper limit as a distance between the vehicle and a speed limit point becomes shorter and control a decrease rate of the reaction force to be decreased within a predetermined lower limit as the distance between the vehicle and the speed limit point becomes longer, and
    wherein the speed limit point is a road point at which the vehicle's speed is to be decelerated.

2. The vehicle according to claim 1, wherein the controller is configured to display the object on the display when deceleration of the vehicle is required to the predetermined speed within a predetermined distance.

3. The vehicle according to claim 1, wherein the controller is configured to increase the reaction force of the accelerator pedal until the reaction force reaches a predetermined reference value when deceleration of the vehicle is required to the predetermined speed within a predetermined distance.

4. The vehicle according to claim 1, wherein the controller is configured to control the reaction force of the accelerator pedal so that the reaction force applied to the accelerator pedal during the inertial driving of the vehicle maintains a predetermined reference value.

5. The vehicle according to claim 1, wherein the controller is configured to gradually reduce the reaction force applied to the accelerator pedal when the inertial driving of the vehicle is terminated.

6. The vehicle according to claim 1, wherein the controller is configured to determine to perform the guidance on the inertial driving of the vehicle when it is determined that deceleration of the vehicle is required based on a running route and road information.

7. A method for controlling a vehicle comprising:
    determining whether guidance for inertial driving of the vehicle is required;
    displaying an object guiding the inertial driving on a display at a guiding time point when the guidance for the inertial driving of the vehicle is required;
    applying a reaction force to an accelerator pedal to induce the inertial driving; and
    gradually reducing the reaction force applied to the accelerator pedal after the vehicle is decelerated to a predetermined speed,
    wherein the object is at least one of an image or a text that characterizes inertial driving,
    wherein the applying of the reaction force to the accelerator pedal to induce the inertial driving comprises:

controlling an increase rate of the reaction force to be increased within a predetermined upper limit as a distance between the vehicle and a speed limit point becomes shorter, and controlling a decrease rate of the reaction force to be decreased within a predetermined lower limit as the distance between the vehicle and the speed limit point becomes longer, and wherein the speed limit point is a road point at which the vehicle's speed is to be decelerated.

8. The method according to claim 7, wherein the displaying of the object guiding the inertial driving on the display at the guiding time point comprises:

displaying the object on the display when deceleration of the vehicle is required to the predetermined speed within a predetermined distance.

9. The method according to claim 7, wherein the applying of the reaction force to the accelerator pedal to induce the inertial driving comprises:

increasing the reaction force of the accelerator pedal until the reaction force reaches a predetermined reference value when deceleration of the vehicle is required to the predetermined speed within a predetermined distance.

10. The method according to claim 7, wherein the applying of reaction force to the accelerator pedal to induce the inertial driving comprises:

controlling the reaction force of the accelerator pedal so that the reaction force applied to the accelerator pedal during the inertial driving of the vehicle maintains a predetermined reference value.

11. The method according to claim 7, wherein the applying of reaction force to the accelerator pedal to induce the inertial driving comprises:

gradually reducing the reaction force applied to the accelerator pedal when the inertial driving of the vehicle is terminated.

12. The method according to claim 7, wherein the determining of whether guidance for the inertial driving of the vehicle is required comprises:

determining to perform the guidance on the inertial driving of the vehicle when it is determined that deceleration of the vehicle is required based on a running route and road information.

* * * * *